US005361494A

United States Patent [19]

Robertson et al.

[11] Patent Number: 5,361,494

[45] Date of Patent: Nov. 8, 1994

[54] METHOD OF MAKING A PAIR OF WHEELCHAIR SIDE FRAME ASSEMBLIES

[75] Inventors: A. Scott Robertson, Pasadena; Richard Geiger, Santa Cruz, both of Calif.

[73] Assignee: Medical Composite Technology, Inc., Watsonville, Calif.

[21] Appl. No.: 107,073

[22] Filed: Aug. 17, 1993

Related U.S. Application Data

[62] Division of Ser. No. 789,173, Nov. 8, 1991, Pat. No. 5,267,745.

[51] Int. Cl.[5] .............................................. B23P 19/04

[52] U.S. Cl. ...................................... 29/897.2; 29/897

[58] Field of Search .................... 29/33 D, 455.1, 464, 29/469, 897, 897.2, 897.312; 280/250.1, 304.1; 297/42, 45, DIG. 4; 403/169, 172, 363; 83/54

[56] References Cited

U.S. PATENT DOCUMENTS

| | | | |
|---|---|---|---|
| 3,917,312 | 11/1975 | Rodaway | 297/DIG. 4 X |
| 4,232,897 | 11/1980 | Maclaren et al. | 297/45 |
| 4,317,581 | 3/1982 | Kassai | 297/45 X |
| 4,405,142 | 9/1983 | Whetstine | 280/250.1 |
| 4,650,201 | 3/1987 | Hartwell | 280/250.1 |
| 5,020,816 | 6/1991 | Mulholland | 280/250.1 |
| 5,152,543 | 10/1992 | Sims et al. | 280/250.1 |
| 5,249,818 | 10/1993 | Patterson | 83/54 X |

*Primary Examiner*—Peter Dungba Vo

*Attorney, Agent, or Firm*—Burns, Doane, Swecker & Mathis

[57] ABSTRACT

A wheelchair includes a chassis having a pair of side frame assemblies that are rigidly connected to each other by a seat pan. Mounted on each side frame assembly is an interchangeable axle receiving platform for orienting drive wheels at a desired camber angle. One end of a seat member is pivotally attached to a foot member for adjustment of the seating angle. By moving an opposite end of the seat member along a curved portion of a bottom member of each side frame assembly, the seat angle is changed. A one piece caster assembly is disposed forward of the drivewheels on the chassis. Through the one-piece caster assembly, each caster can be simultaneously adjusted to a particular location along the frame.

20 Claims, 4 Drawing Sheets

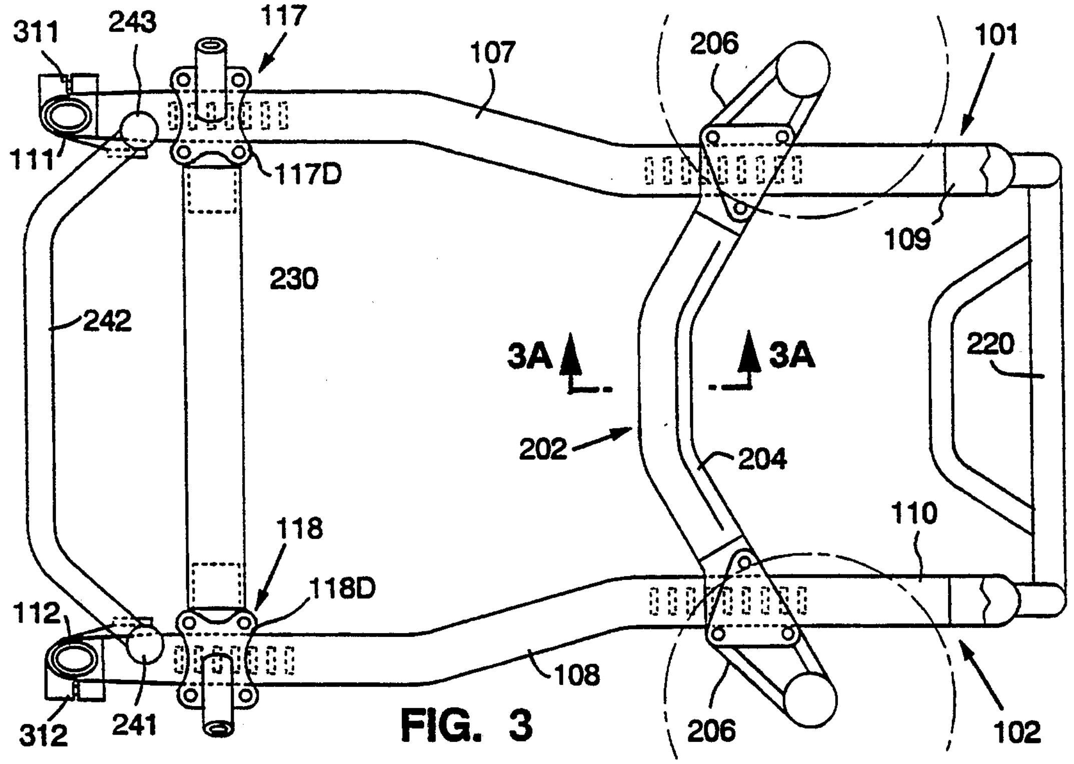
FIG. 3
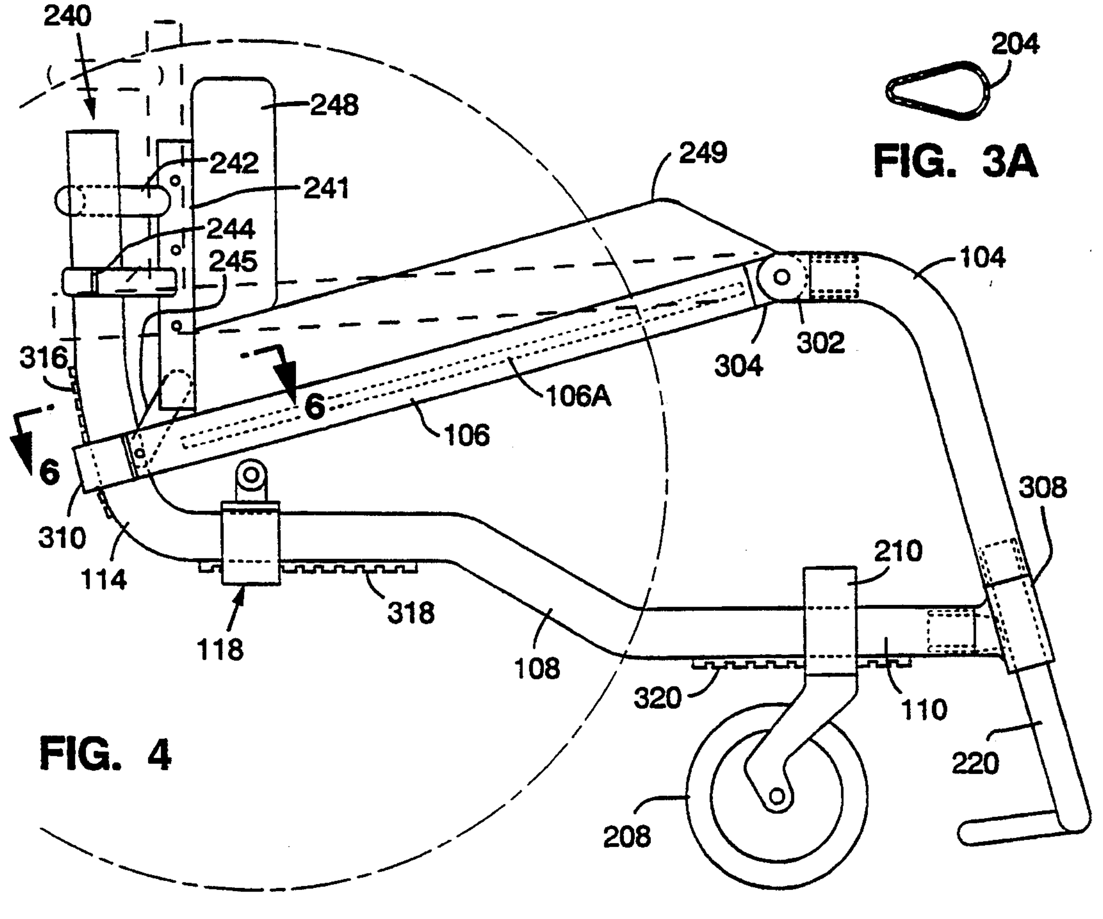
FIG. 3A
FIG. 4

METHOD OF MAKING A PAIR OF WHEELCHAIR SIDE FRAME ASSEMBLIES

This application is a divisional of application Ser. No. 07/789,173, filed Nov. 8, 1991, now U.S. Pat. No. 5,267,745 issued Dec. 7, 1993.

FIELD OF THE INVENTION

The present invention relates to a wheelchair and to a wheelchair frame.

BACKGROUND OF THE INVENTION

A longfelt need in the art of wheelchair design is the need to improve wheelchair maneuverability. It has long been known that a reduction in weight aids in obtaining such an improvement, however, such weight reductions are typically accompanied by unacceptable losses in structural rigidity.

It has aim been known to design wheelchair frames so as to orient a user's weight on the wheelchair in a manner favorable to improved maneuverability. Such frames, however, often require expensive manufacturing techniques and materials in order to provide a suitably configured frame without unacceptable weight increases.

Another longfelt need in the art of wheelchair design is the need to provide a wheelchair that is universally adjustable to accommodate the widest variety of users for the widest variety of uses. This need has lead to numerous wheelchair designs that, while offering the desired adjustability, have the disadvantage of numerous supplementary parts and pieces. These extra parts and pieces increase the wheelchair weight and often require the user to carry specific tools in order to carry out desired adjustments.

Accordingly, it is an object of the present invention to provide a wheelchair that addresses these longfelt needs in wheelchair design.

It is an object of the present invention to provide a wheelchair that is highly maneuverable without unacceptable loss in structural rigidity.

It is an object of the present invention to provide a wheelchair that is highly maneuverable and is lightweight.

It is an object of the present invention to provide a wheelchair that is universally adjustable to accommodate a wide variety of users and a wide variety of uses.

It is an object of the present invention to provide a wheelchair that is easily adjustable with a minimum of tools.

SUMMARY OF THE INVENTION

A wheelchair frame in accordance with the present invention includes a pair of side frame assemblies, each of which includes a bottom member, a foot rest member and a seat member. The frame also includes a means for receiving a wheel axle disposed on each of the bottom members, A support means rigidly connects the side frame assemblies to each other and includes a first cross-beam member disposed between the means for receiving a wheel axle on each of the bottom members. The support means also includes a rigid seat pan positioned between each of the seat members of the pair of side frame assemblies.

A wheelchair in accordance with the present invention also includes a wheelchair chassis having a pair of side frame assemblies and including support means for rigidly connecting the side frame assemblies together. Each side frame assembly includes a bottom member, a seat member and a foot rest member.

The wheelchair also includes means for receiving a drive wheel axle disposed on each of the side frame assemblies wherein the means for receiving includes a plurality of interchangeable axle receiving platforms. Each of the platforms has an axle receiving cylinder oriented at a different predetermined camber angle. A pair of drive wheels is included wherein each wheel is mounted on the means for receiving a drive wheel axle.

A wheelchair in accordance with the present invention also includes a wheelchair chassis having a pair of side frame assemblies wherein each assembly includes a bottom member and a seat member which is pivotally attached to a forward portion of the bottom member and adjustably attached to a rearward portion of the bottom member. In a similar aspect, a footrest member can be positioned between the forward portion of the bottom member and the pivot attachment of the seat member.

A one piece caster assembly is provided and is disposed forward of the drive wheels on the wheelchair chassis. The caster assembly includes a pair of casters attached to opposite ends of a cross-bar wherein the crossbar extends substantially the distance between the bottom members of the side frame assemblies. The caster assembly includes clamping means at each end of the cross-bar for securing the caster assembly at a desired location along each bottom member of each side frame assembly.

A wheelchair frame in accordance with the present invention comprises tubular members connected by lug members which are adapted for insertion into the ends of said tubular members and for being adhesively attached or bonded in the ends of said tubular members. The tubular members can be various desired cross section shapes such as elliptical, triangular, circular or noncircular. The lug members can be rigid lug members for attachment for one tubular member to another tubular member, can comprise clamp means for attaching the end of one tubular member to an intermediate point of another tubular member, or it can comprise pivot means where one tubular member can be pivotally attached to another tubular member.

This invention provides a method of making a wheelchair frame comprising providing the desired tubular members, cutting the tubular members to the desired length and inserting into the ends of the tubular members the desired lugs for attaching the tubular members to other tubular members, adhesively attaching or bonding the lug members to the interior of the tubular members. This method provides means for assembling pairs of wheelchair sideframe assemblies which are then adapted for rigid attachment to one another to form a wheelchair frame.

BRIEF DESCRIPTION OF THE DRAWINGS

Preferred embodiments of the present invention will be described in detail with reference to the accompanying drawings, wherein like reference numerals identify like members and whereto:

FIG. 3 is a top view of a first embodiment of a wheelchair and wheelchair frame with seat removed in accordance with the present invention.

FIG. 3A is a cross-sectional view taken along the lines 3A—3A of FIG. 3.

FIG. 4 is a side view of a first embodiment of a wheelchair and wheelchair frame in accordance with the present invention.

DESCRIPTION

A wheelchair and wheelchair frame in accordance with the present invention (FIG. 1) is formed of a chassis that includes a pair of side frame assemblies 101,102. The two side frame assemblies 101,102 are connected to each other to form a rigid frame by a seat pan 250 and a cross-beam 230. By utilizing the seat pan 250 as a structurally supportive member, the use of additional cross-beams can be avoided.

Figure 8:
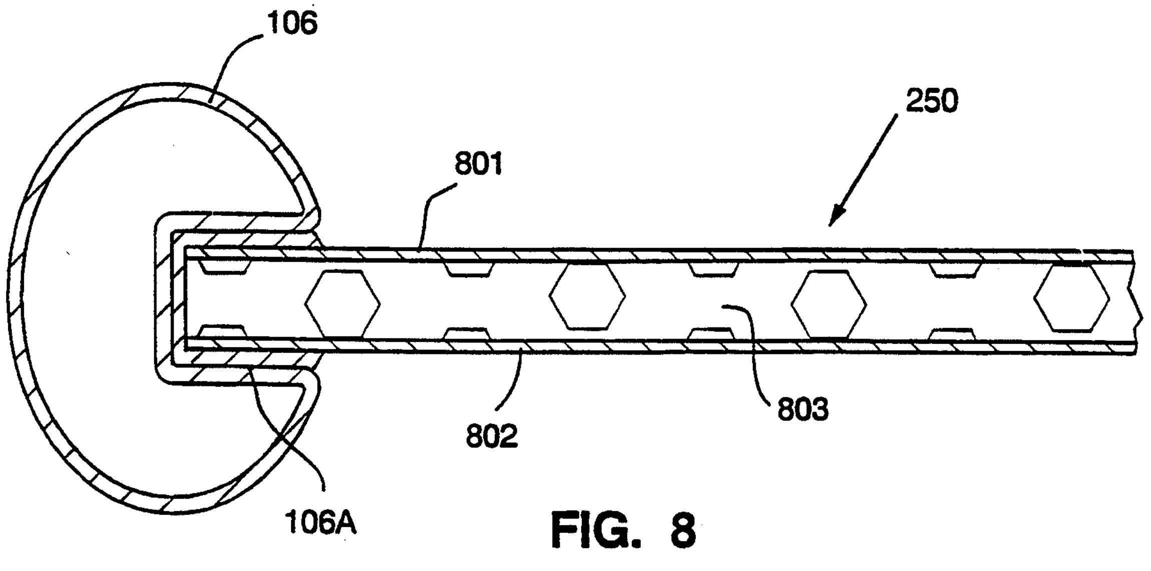
FIG. 8 is a cross sectional view of a seat pan used in a preferred embodiment of a wheelchair and wheelchair frame in accordance with the present invention.

To provide the required structural rigidity to the connection of the two side frame assemblies 101, 102, the cross-beam 230 can be made from any sufficiently strong metallic material such as aluminum or a sufficiently strong composite material. Similarly, the seat pan 250 can also be made from any suitably strong material. However, to reduce weight while maintaining structural rigidity, the seat pan 250 in one preferred embodiment is fabricated as a sandwich laminate (FIG. 8). Such a sandwich laminate includes a pair of outside, or "skin", layers 801,802 separated by a sandwich core 803. The skin layers 801,802 provide the structural rigidity and load bearing characteristics required for connecting the two side frame assemblies 101,102 together while the core material 803 serves to keep the two skin layers separated.

Since the skin layers are structurally supportive, they must be fabricated from sufficiently strong materials. Aluminum may be used as well as a sufficiently reinforced composite. However, since the core material need only be strong enough to keep the skin layers separated, any number of suitable lightweight materials may be used. For example, a composite honeycomb material (FIG. 8), a metallic honeycomb material or an expanded plastic material are all acceptable. Other core materials that may be considered are foam, corrugated paper or even air.

Mounted on the frame formed by the connection of the two side frame assemblies 101, 102. (FIG. 1) are a pair of drive wheels 115,116, a caster assembly 202, a backrest assembly 240, and a foot rest 220. Each of these items is attached to the wheelchair frame in a manner that is discussed in greater detail below. On the seat pan 250 is mounted a seat cushion 249, and back cushion 248 can aim be supported thereon.

Each side frame assembly 101,102 includes three members (FIG. 1), a bottom member 107, 108, a foot rest member 103, 104, and a seat member 105, 106. Furthermore, each bottom member 107, 108, includes a forward end 109, 110 that extends in a generally horizontal direction and a rearward end 111, 112 that extends in a generally upward direction. The rearward end 111, 112 of each bottom member 107, 108 includes a curved portion 113, 114. The forward end 109, 110 is separated from the rearward end 111, 112 by a middle region that is configured to position the forward end 109, 110 at a location lower than, and inwardly from, the rearward end 111, 112 (FIGS. 3 and 4).

The seat back assembly 240 is mounted to the rearward ends 111, 112 of each bottom member 107, 108 by split clamps 244 and by clamps 310. The caster assembly 202 is mounted to a region near the front end 109, 110 of each bottom member 107, 108 by clamps 206. Mounted on the middle region of each bottom member 107, 108 are axle receiving assemblies 117, 118 for the drive wheels 115, 116. The seat pan 250 is mounted in slots 105A, 106A of each seat member 105, 106 (FIGS. 1, 2, 4 and 8).

The two side frame assemblies 101,102 are substantially identical in construction. Hence, the description of one side frame assembly 102 is equally applicable to the other side frame assembly 101 (FIG. 2).

One end of the foot rest member 104 is connected to the forward end 110 of the bottom member 108 by a lug 308. The lug 308 is adhesively bonded to both the forward end 110 of the bottom member 108 and to the foot rest member 104. The seat member 106 extends from an opposite end of the foot rest member 104 to the rearward end 112 of the bottom member 108.

Figure 2:
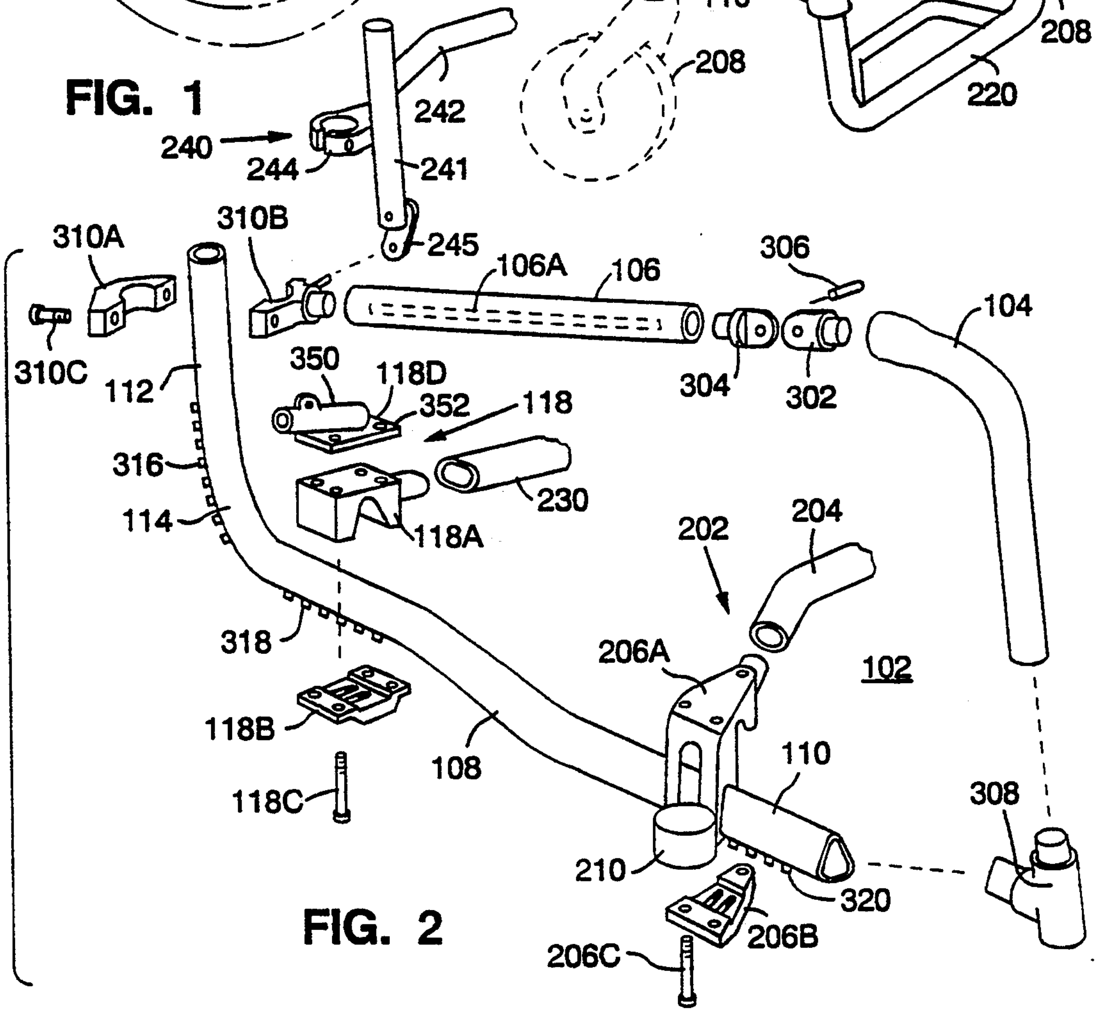
FIG. 2 is a blown-up view of a side of a first embodiment of a wheelchair and wheelchair frame in accordance with the present invention.
Figure 5:
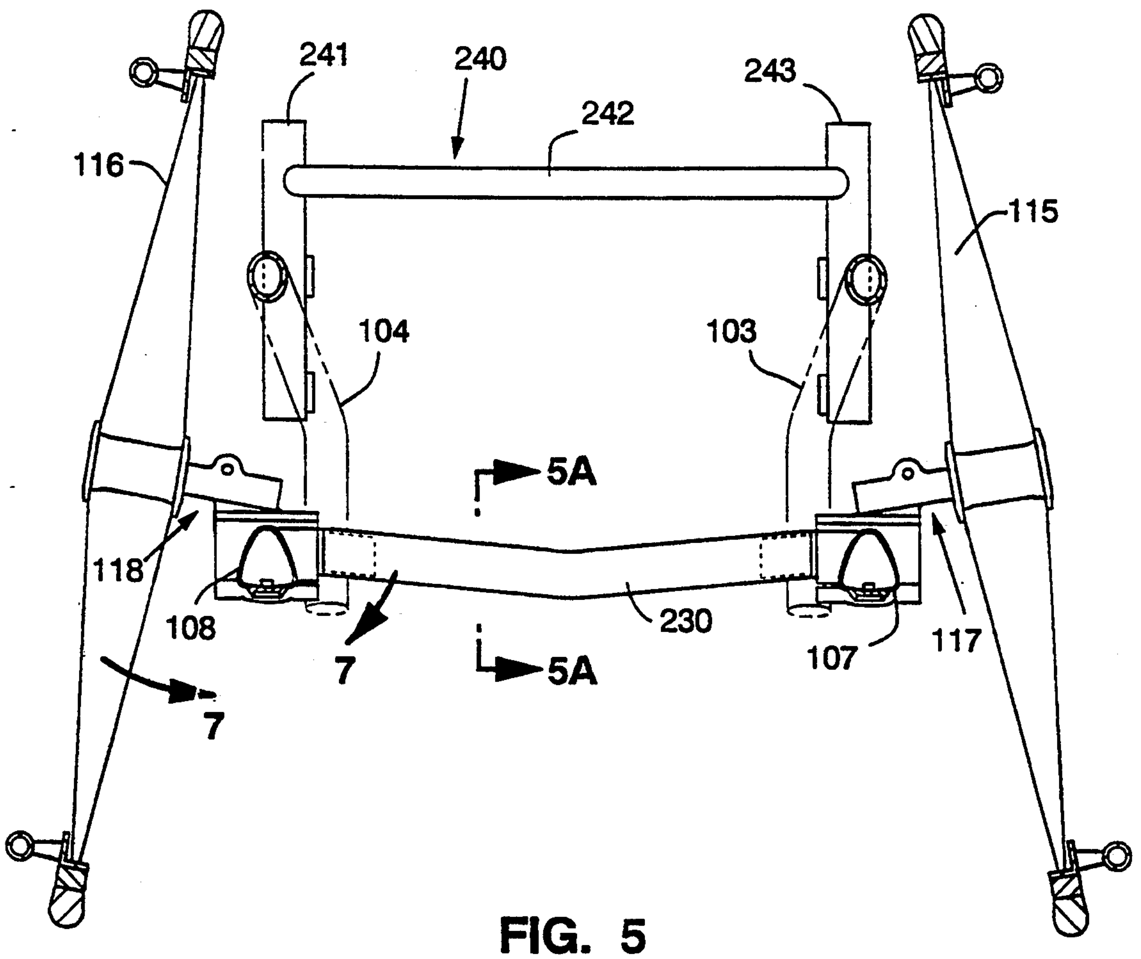
FIG. 5 is a front cross sectional view of a first embodiment of a wheelchair and wheelchair frame in accordance with the present invention.
Figure 5A:
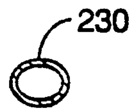
FIG. 5A is a cross sectional view taken along the lines 5A—5A in FIG. 5.

The seat member 106 is connected to the foot rest member 104 by a pivot joint and lug assembly 301 that includes pivot lug fork 302, pivot lug plug 304 and pivot pin 306 (FIG. 2). Each of the lugs 302, 304 are adhesively bonded to the foot rest member 104 and the seat member 106, respectively. The opposite end of the seat member 106 is adjustably connected at a location along the curved portion 113 of the rearward end 112 of the bottom member 108 by a clamp assembly 310 that includes clamp halves 310A 310B connected together with commonly known fasteners 310C.

Figure 1:
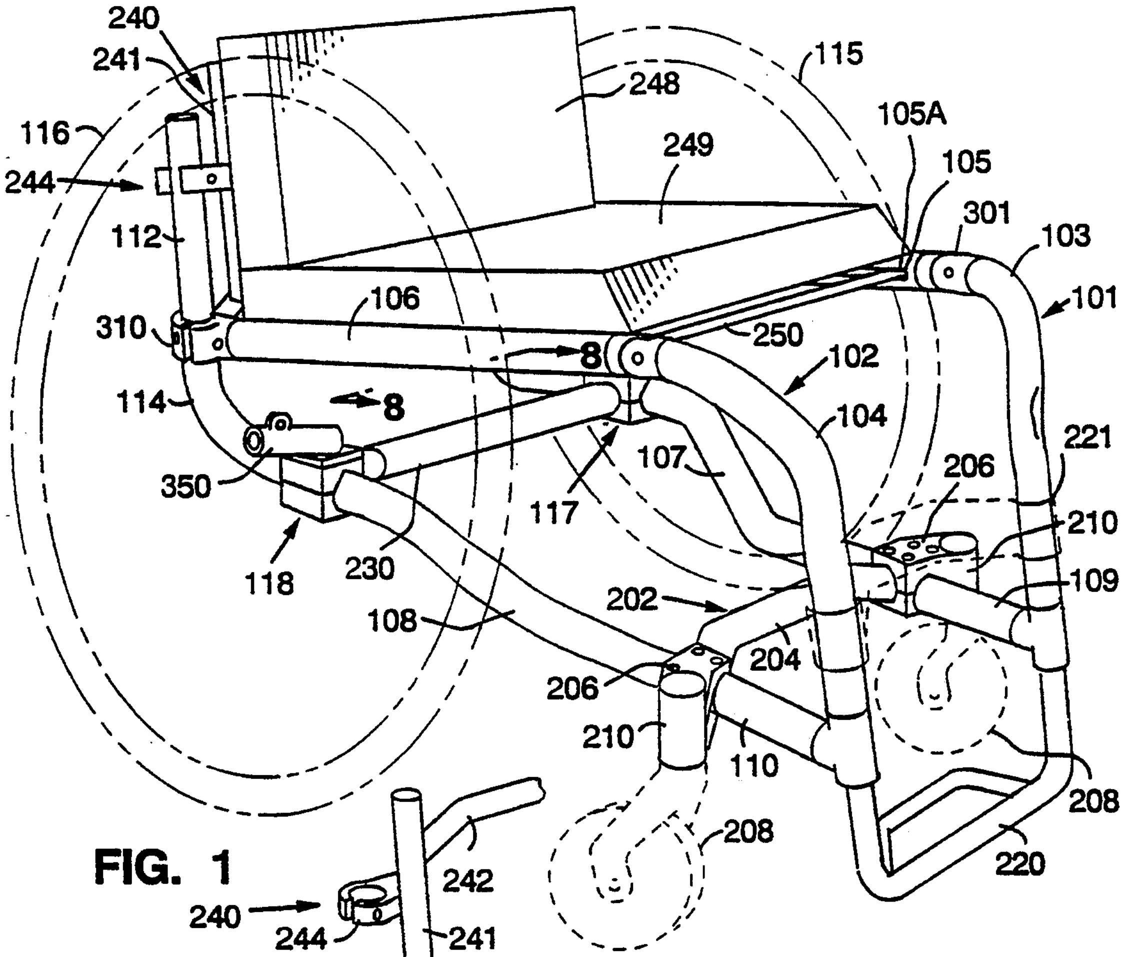
FIG. 1 is a perspective view of a first embodiment of a wheelchair and wheelchair frame in accordance with the present invention.

Due to the pivot joint 301 between the foot rest member 104 and the seat member 106, the seat member 106 (and therefore seat pan 250) can pivot so as to adjust the seat pan angle according to the desire of the user. The final location of the clamp 310 on the curved portion 114 will set the seat pan angle. As will be recognized the pivot point 301 can be located at any desired position along the upper frame or lower frame forward of the castor wheel assembly. In one embodiment, seat member 106 and foot rest member 104 can be merged into a single member, and pivot joint 301 can be positioned in bottom member 110 forward of the castor assembly 202, or at the end of bottom member 110, or at lug 308. A preferred embodiment is shown in FIGS. 1, 2 and 4, wherein pivot joint 301 is positioned between the seat member 106 and the leg rest member 104.

The curved portion 114 of the bottom member 108 has a radius of curvature that is substantially equal to the length of the seat member 106. Consequently, the clamp 310 may be freely moved along this curved portion 114 without a need to vary the length of seat member 106 or to somehow change orientation of the rearward end 112 of the bottom member 108 (FIG. 4).

Figure 7:
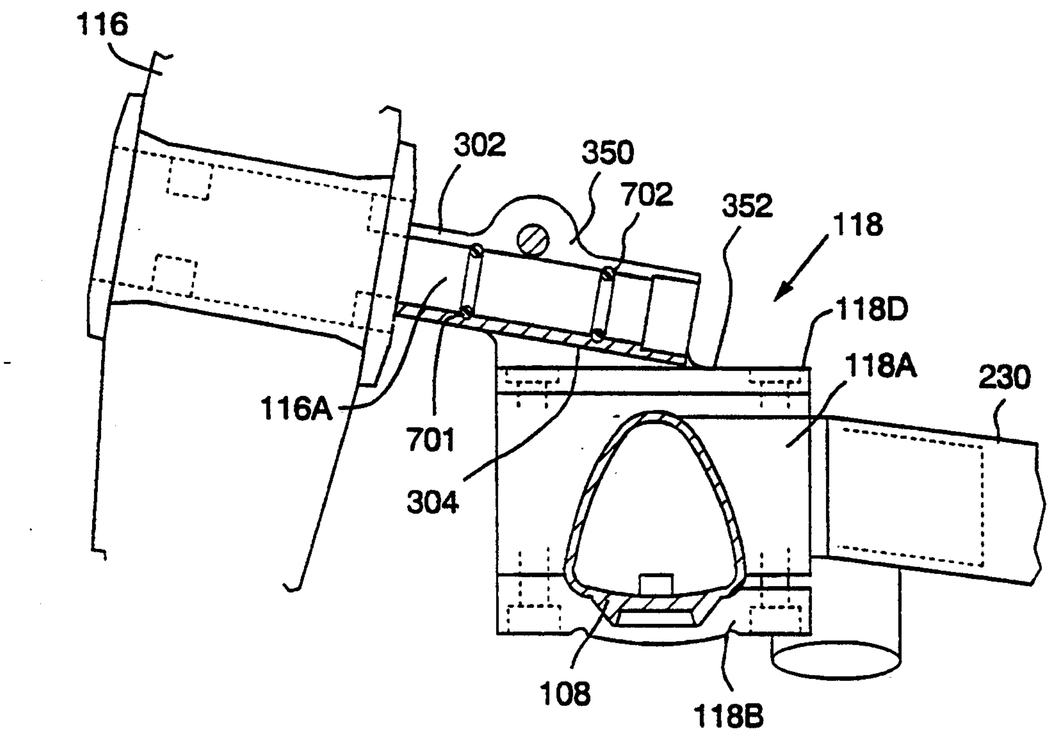
FIG. 7 is a detail view of area 7—7 of FIG. 5.

The axle-receiving assembly 118 is mounted to a middle region of the bottom member 108 and includes clamp halves 118A, 118B that are secured to one another by commonly known fasteners 118C. Secured to the top clamp half 118A is an interchangeable axle receiving platform 118D (FIG. 7).

Each interchangeable axle-receiving platform 118D (FIGS. 1–3, 5 and 7) includes an axle-receiving cylinder 350 that extends at a predetermined angle from a flange 352. The angle from which the axle-receiving cylinder 350 extends provides a predetermined camber angle to the drive wheel whose axle is ultimately mounted in the cylinder 350. The axle of a drive wheel is secured in the axle-receiving cylinder 350 by a split clamp (not shown). However, to remove undesirable clearance that often exists, a pair of O-rings 701,702 are included inside the cylinder 350 (FIG. 7).

The thickness of the flange 352 for each interchangeable platform 118D vanes according to each camber angle provided by each platform. The thickness vanes such that the wheelchair frame is maintained at a constant level relative to the traveling surface for any camber angle provided to the wheels by the axle receiving cylinder 350. For example, the flange on a platform 118D providing one camber angle will be thicker on a platform 118D providing a greater camber angle.

However, in order for a user to also adjust the wheelchair frame height, a set of interchangeable axle-receiving platforms 118D may be provided for each different desired wheelchair frame height. The thickness of flange 352 for each platform 118D in a different set provides the desired frame height for that set; however, the thickness of flange 352 of each platform within that set vanes from other flange thicknesses in that set in a manner to still provide the advantage of changing camber angle without changing the particular frame height for that set. In this manner, even greater adjustability is offered to the user.

Such adjustability is especially advantageous when a user decides to change from the current drive wheels to another set of drive wheels that have a different diameter than the original drive wheels. Having different sets of interchangeable axle-receiving platforms 118D to choose from the user can either maintain the same frame height as with the original drive wheels or change to a different frame height. Moreover, once a particular set of platforms is chosen, the user can maintain that selected frame height and still vary the camber angle of the drive wheels.

The caster assembly 202 includes a pair of casters 208 secured in a caster retention member 210. The casters 208 are attached to opposite ends of a crossbar 204 by means of a clamp 206 (FIG. 1, 2 and 3). The clamp 206 includes two clamp halves 206A, 206B which are secured together by commonly known fasteners 206C.

Each clamp 206 of the caster assembly 202 is secured at a desired location along a front region of the front and 110, 109 of each front member 107, 108. Since both casters are attached to the crossbar 204, the casters 208 can be simultaneously moved forward or rearward along the bottom members 107, 108. Such simultaneous movement eases the adjustment of the castor wheels since proper alignment is better ensured.

Figure 6:
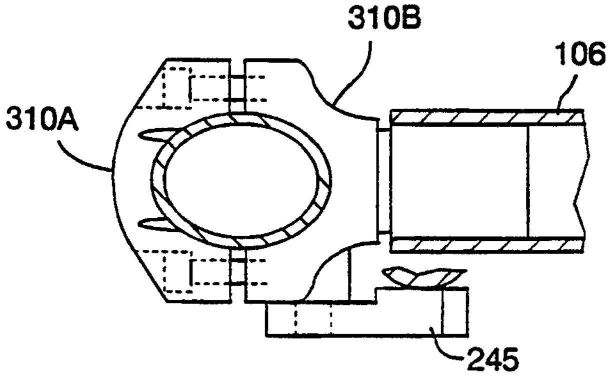
FIG. 6 is a cross sectional view taken along the lines 6—6 of FIG. 4.

The toward end 110 of the bottom member 108 has a cross section that is substantially triangular (FIG. 2). Furthermore, the clamp halves 206A, 206B are fabricated to conform to this generally triangular cross section. Consequently, the clamp 206 is maintained in a proper circumferential location around the forward end 110 despite any torque or moment arm that is applied to the caster assembly 202. The cross-section of forward end 110 can have any non-round shape and the same result will be achieved as long as clamp halves 206A, 206B are fabricated to conform to the same non-round cross section. The rearward end 112 of the bottom member 108 has a generally circular cross section (FIGS. 3 and 6).

The cross bar 204 of the caster assembly 202 has a U-shape such that the cross bar curves inwardly in a direction toward the rear of the wheelchair when the caster assembly 202 is mounted on the chassis (FIG. 3). The U-shape allows greater room for a user during movement into and out of the chair. Furthermore, the cross bar 204 is configured such that a user's feet may be rested upon the cross bar member 204. In a preferred embodiment, such a configuration includes the cross bar 204 having a non-round cross section (FIG. 3A). Allowing placement of the user's feet in this manner reduces the polar moment of inertia of the wheelchair during use which is especially useful during sporting events when greater maneuverability is desired.

To ensure that the clamp 310 for the seat member 106, the clamp 118A, 118B for the axle-receiving assembly 118 and the clamp 206 for the caster assembly 202 are secured in a desired location, a serrated strip 316, 318, 320 is fixed to the curved portion 114, to a portion of the middle region and to a forward end region of the bottom member 108, respectively (FIGS. 2 and 4). Accordingly, each clamp is movable to distinct positions along said bottom member 108 according to locations of the serrations on each strip. The strips may be fabricated to include a color, number or letter scheme, so that placement of each clamp on each of bottom members 107 and 108 can be matched so that proper alignment can be visually verified.

The seat back assembly 240 (FIGS. 1–5) includes a pair of posts 241,243 connected to each other by a push bar 242. Mounted on the posts is a seat back cushion 248. Each post 241,243 includes a split clamp 244 and a pivoting tab member 245 for connecting the seat back assembly to the rearward ends 112,111 of the bottom members 107, 108. The tab member 245 pivotally connects the clamp 310 for the seat member 106 to the post 241 of the seat back assembly 240 and pivots according to placement of the clamp 310 along the curved position 114 of the bottom member 108 (FIGS. 1, 4 and 6). The split clamp 244 along with the clamp 310 secures the seat back assembly at a desired vertical location along the rearward ends 111, 112 of the bottom members 107, 108 (FIG. 2). Moreover, the pivoting movement allowed by the tab member 245 enables the seat back assembly to maintain suitable angular orientation relative to the seat pan 250 regardless of the ultimate seat pan angle.

Connected to the ends of the foot rest members 103, 104 is a U-shaped footrest 220 (FIG. 1, 3 and 4). Opposite ends of the footrest 220 are telescopically received in each footrest member 103, 104 through the lug 308. The lug 308 includes a set screw (not shown) for securing the footrest 220 in a desired position. A leg rest strap 210 spans across the distance between the footrest members 103, 104 to provide further support to a user's legs.

Each side frame assembly 101,102 is assembled by means of tubes and lugs only (FIG. 2) with the wheel assemblies 230 and 202 (FIG. 1) mounted by means of clamps and the foot rest assembly 220 (FIG. 1) telescoped inside lugs 308. Consequently neither the lower member 108, the leg rest member 104 nor the seat member 106 needs any through-holes to accommodate common fasteners (e.g. bolts, pins, etc.). The absence of such through-holes thus precludes the presence of stress risers in the frame members, which in turn improves reliability and durability of the frame.

The various structural elements of the wheelchair can be fabricated from any suitable materials and by any suitable methods. However, in order to achieve optimum weight, it is desirable that the bottom members 107, 108 and the footrest members 103, 104 be made from composite material.

The seat member 105, 106 may also be fabricated from any suitable material. If such material is composite, the slot 105A, 106A could be a molded in feature of the seat member 105, 106.

The construction of a wheelchair frame assembly or wheelchair frame according to this invention by providing tubular members, cutting the tubular members to the desired length. Inserting into the ends of said tubular members the appropriate lug members for attachment of the tubular members to other tubular members provides numerous advantages and efficiencies in the wheelchair frame structure as well as the manufacture of the wheelchair frames.

The wheelchair frame construction according to the present invention using the tubular members with the lug members adhesively bonded into the ends of the tubular members provides a wheelchair frame construction wherein the tubular members need not have any through holes or other penetration of the walls of the tubular members. The absence of through holes in the tubular members enables the construction of the wheelchair frame using thinner and lighter weight tubular members having thinner wall thickness than would be necessary if the tubular structure were weakened by having through holes or other penetrations of the walls of the tubular members. This is true whether the tubular members are metal such as aluminum, titanium, etc. or are of various fiber reinforced resin or composite materials.

The tubular member/lug member construction of a wheelchair frame according to the present invention also provides numerous other structural advantages for the wheelchair frame. The tubular members can be constructed of varying cross section shapes of varying diameters and wall thicknesses along the length of the tubular members to provide various strength and flex properties in various portions along the tubular members. This is particularly preferred in making composite tubular members wherein the fiber reinforcement can be configured as a braided sleeve, wound fibers, woven fabric, longitudinal fibers, etc. In molding a fiber reinforced polymer composite tubular member, the cross sectional shape, wall thickness, shape of the tube, orientation of the fibers can all be selected as desired without regard to the necessity of reinforcing points where through holes would be placed according to conventional construction.

Construction of the tubular member/lug member frame according to the present invention, provides full flexibility for attachment of tubular members to each other using lug members which are inserted and adhesively bonded into the ends of the tubes, lug members which clamp the intermediate areas of other tubular members, lug members which contain pivot points wherein one tubular member can be pivotally mounted relative to another tubular member, and lug members which contain an inside opening for the telescoping of another tubular member therein. Other types of lug members can be employed in the wheelchair frame according to this invention.

As illustrated in the drawings in this application, the tubular members can assume various noncircular cross sectional shapes which particularly facilitate clamping of various lug members to the intermediate portion of a noncircular tubular member whereby rotation around the tubular member is prevented in order to maintain the desired alignment of the member clamped on the noncircular tubular member. For example, in FIGS. 1 and 2 upper tubular members 103, 104, 105 and 106 are generally circular in cross section, except that 105 and 106 are shaped to receive the seat pan. Lower tubular members 107 and 108 are triangular in shape to provide means to prevent clamps such as 118 and 206 from being able to rotate or slip around the lower tubular member. This noncircular cross section of the tubular member enables the accurate maintenance of alignment and positioning of the clamp and the cross members attached to those clamps.

The tubular member/lug member construction of a wheelchair frame according to the present invention enables convenient transition from one tubular member to another tubular member or other structural member. For example, lug members may be inserted into and adhesively bonded into a tubular member to transition from one type of metal tubular member to another type of metal tubular member, or to transition from a composite tubular member to a metal tubular member, or simply to transition from one structural member to another structural member.

The tubular member/lug member construction of wheelchair frames according to the present invention also provides convenient means for incorporating various aspects and advantages of composite tubular construction which are known in other technology areas, but heretofore unknown in the wheelchair art. For example, the wheelchair frame construction according to the present invention can incorporate various designs of composite construction wherein the reinforcing fiber orientation is constructed to achieve various strength and flexural properties of the tubular members at specific locations as desired for the wheelchair frame design. The composite tubular members can be constructed to provide an anisotropic wheelchair frame, i.e., frame members that are rigid in one direction and flexible in another direction provide the desired anisotropic wheelchair frame. This provides desired shock damping in one direction, but maintains the desired strength and rigidity in another direction. The composite tubular members can be constructed with fiber orientation to provide increased hoop strength at areas where a clamp or lug clamp would provide external compression pressures on the tubular member. A different fiber orientation may be desired in the end areas of the composite tubular members where the lugs are inserted into and adhesively bonded to the interior portions of the composite tubular members. Techniques are known in other technology areas for obtaining such varied properties of composite tubular members, which techniques can be readily applied following the teachings of the present invention to achieve the desired designs and properties for the tubular member/lug member wheelchair frames of the present invention.

The tubular member/lug member construction of wheelchair frames according to the present invention also provide numerous advantages in the efficiency of manufacture of the wheelchair frames. For example, the various tubular members for a standard wheelchair frame design can be mass produced in one set of molds for given properties and produced in a maximum length. In the actual assembly of the wheelchair frames, those standard tubular members can then be cut to desired length before assembling with the lug members to provide wheelchair frames of different desired sizes. This is true for both length and height of wheelchair as well as the width of the wheelchair frames. In addition, it will be apparent to one skilled in the art following the teaching of this invention, that various standard members such as cross bars or castor wheel assemblies can also be made in standard lengths and utilized in order to change the dimensions of an existing wheelchair by unclamping one set of standard cross members and replacing them with a different length of cross members to provide a modified width for an existing wheelchair frame.

In the construction of composite tubular members for wheelchair frames in accordance with this invention, conventional reinforcing fibers may be used, such as carbon fibers, fiber glass aramid, etc. The polymers used can also be conventional polymers, such as epoxies, polyesters and the like. Another advantage in increased efficiency provided in the manufacture of wheelchair frames according to the present invention is that the composite tubular members can be formed of polymeric materials of desired finish and color, thus eliminating the necessity of finishing or painting the wheelchair frame assembly after it is completed.

The principals, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims may be embraced thereby.

What is claimed is:

1. A method of making a pair of wheelchair side frame assemblies comprising:
- providing a pair of upper tubular members having a desired cross section shape, each of said upper tubular members having a first end and a second end;
- providing a pair of lower tubular members having a desired cross section shape;
- cutting said lower tubular members to a desired length so that each lower tubular member includes a first end and a second end;
- fitting at the first end of the upper tubular members a first lug insert having a clamp element attached thereto which encircles a portion of a respective lower tubular member and is movable along the respective lower tubular member; and
- fitting a second lug insert .at the second end of each upper tubular member and at the second end of the respective lower tubular member.

2. A method according to claim 1, wherein the upper and lower tubular members provided are metal.

3. A method according to claim 1, wherein the upper and lower tubular members provided are fiber reinforced composite tubular members.

4. The method according to claim 1, including rigidly connecting the pair of side frame assemblies to one another by providing a rigid seat pan formed of a sandwich laminate that comprises a pair of load bearing skin layers separated by a core, and mounting the rigid seat pan on the pair of upper tubular members.

5. A method according to claim 1, wherein said step of providing a pair of upper tubular members includes providing a pair of foot rest members and a pair of seat members which each include first and second ends, and connecting the first end of each foot rest member to the second end of one of the seat members to define one of the upper tubular members, the second end of each foot rest member having one of the second lugs fitted threat and the first end of each seat member having one of the first lugs fitted threat.

6. A method according to claim 5, wherein said first lug insert is clamped at an intermediate portion of the lower tubular member, and wherein said step of connecting a first end of each foot rest member to a second end of one of the seat members includes fitting one portion of a pivoting lug element at the first end of each foot rest member and fitting another portion of the pivoting lug element at the second end of the respective seat member so that each respective side frame assembly includes one of the seat members, one of the lower tubular members and one of the foot rest members.

7. The method according to claim 6, wherein each pivoting lug element includes two lug portions connected to one another at a pivot point, and wherein said step of providing a pair of lower tubular members includes providing a pair of lower tubular members which each have a curved rear portion, the curved rear portion being formed to have a center of curvature that substantially corresponds to said pivot point of the pivot lug element associated with the respective side frame assembly.

8. The method according to claim 1, wherein each first lug insert is fitted and secured to the first end of the respective upper tubular member without penetrating an outer peripheral surface of the respective upper tubular member.

9. The method according to claim 8, including mounting a drive wheel axle receiving member on each lower tubular member for receiving an axle of a manually operable drive wheel.

10. The method according to claim 1, including providing each of said lower tubular members with locating means for allowing each of said first lug inserts to be clamped at one of a plurality of positions at an intermediate portion of a respective lower tubular member.

11. The method according to claim 10, wherein said locating means is disposed along a curved portion of each lower tubular member.

12. The method according to claim 10, including providing each lower tubular member with additional locating means at a forward region of the lower tubular members for allowing a caster wheel assembly to be clamped at one of a plurality of locations along the forward region of each lower tubular member.

13. A method of making a pair of wheelchair said frame assemblies, comprising:

providing a pair of upper tubular members each having a first end and a second end, the pair of upper tubular members having an outer peripheral surface;

providing a pair of lower tubular members each having a first end and a second end, the pair of lower tubular members having an outer peripheral surface;

fitting a portion of a first lug to the first end of each upper tubular member without forming a hole that penetrates that the outer peripheral surface of the respective upper tubular member;

mounting another portion of each first lug to a respective one of the lower tubular members without forming a hole that penetrates the outer peripheral surface of the respective lower tubular member;

fitting a portion of a second lug to the second end of each upper tubular member without forming a hole that penetrates the outer peripheral surface of the respective upper tubular member; and fitting another portion of each second lug to a respective one of the lower tubular members without forming a hole that penetrates the outer peripheral surface of the respective lower tubular member.

14. The method according to claim 13, wherein said another portion of the first lug includes a clamp, and wherein said step of mounting another portion of each first lug to a respective one of the lower tubular members includes encircling a portion of the respective lower tubular member with a clamp that is movable along the respective lower tubular member.

15. The method according to claim 13, wherein said step of providing a pair of upper tubular members includes providing a pair of seat members which each have an outer peripheral surface and a pair of foot rest members which each have an outer peripheral surface, and including pivotally connecting each of said seat members to a respective one of the foot members at a pivot point so that each pivotally connected foot rest member and seat member define one of the upper tubular members.

16. The method according to claim 15, wherein said step of providing a pair of lower tubular members includes providing a pair of lower tubular members that each include a curved rearward portion on which the another portion of the respective second lug is mounted, each curved portion having a center of curvature that substantially coincides with the pivot point of the respective side frame assembly.

17. The method according to claim 15, wherein said step of pivotally connecting each of the seat members to a respective one of the foot rest members includes pivotally connecting each of the seat members to a respective one of the foot rest members without forming a hole that penetrates the outer peripheral surface of the seat members and foot rest members.

18. A method of making a wheelchair frame, comprising providing a pair of side frame assemblies;

connecting said side frame assemblies to one another;

mounting a drive wheel axle receiving member on each side frame assembly for receiving a manually operable drive wheel;

mounting a caster retention member on each side frame assembly for receiving a caster, said step of providing a pair of side frame assemblies including making each of said side frame assemblies by:

providing a lower tubular member having forward and rearward ends;

providing a tubular seat member having forward and rearward ends;

providing a tubular foot rest member having forward and rearward ends;

fitting one portion of a first lug into the rearward end of the seat member and clamping another portion of the first lug onto the lower tubular member for movement along the lower tubular member;

fitting one portion of a second lug into a forward end of the foot rest member and fitting another portion of the second lug into a forward end of the lower tubular member;

fitting one portion of a third lug into a forward end of the seat member and fitting another portion of the third lug into a rearward end of the foot rest member.

19. The method according to claim 18, wherein said second and third lugs are fitted into respective ends of the foot rest member, lower tubular member and seat member without forming a hole that penetrates an outer peripheral surface of the members.

20. The method according to claim 18, wherein the one portion and the another portion of the third lug are pivotally connected so that the seat member can pivot relative to the foot rest member, said step of providing a lower tubular member including providing a lower tubular member having a curved rearward portion.

* * * * *